United States Patent
Feller et al.

(10) Patent No.: US 6,904,566 B2
(45) Date of Patent: Jun. 7, 2005

(54) METHODS, SYSTEMS AND MEDIA PLAYERS FOR RENDERING DIFFERENT MEDIA TYPES

(75) Inventors: Chris Feller, Bellevue, WA (US); Geoffrey Harris, Seattle, WA (US); Kipley J. Olson, Seattle, WA (US); Michael J. Novak, Redmond, WA (US); Tedd K Dideriksen, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 09/817,901

(22) Filed: Mar. 26, 2001

(65) Prior Publication Data

US 2003/0076345 A1 Apr. 24, 2003

(Under 37 CFR 1.47)

(51) Int. Cl.[7] .................................................. G06F 5/00
(52) U.S. Cl. ....................................... 715/728; 715/716
(58) Field of Search ................................ 715/716, 727, 715/728, 730, 762, 765, 756, 805; 345/716, 723, 727, 853, 854

(56) References Cited

U.S. PATENT DOCUMENTS

| | | | |
|---|---|---|---|
| 5,642,171 A | 6/1997 | Baumgartner et al. | |
| 5,655,144 A | 8/1997 | Milne et al. | |
| 5,995,491 A | 11/1999 | Richter et al. | |
| 6,144,375 A | 11/2000 | Jain et al. | |
| 6,199,076 B1 | 3/2001 | Logan et al. | |
| 6,248,946 B1 | 6/2001 | Dwek | |
| 6,262,724 B1 * | 7/2001 | Crow et al. | 345/723 |
| 6,269,122 B1 | 7/2001 | Prasad et al. | |
| 6,314,569 B1 | 11/2001 | Chernock et al. | |
| 6,330,670 B1 | 12/2001 | England et al. | |
| 6,360,202 B1 | 3/2002 | Bhadkamkar et al. | |
| 6,369,822 B1 | 4/2002 | Peevers et al. | |
| 6,442,758 B1 | 8/2002 | Jang et al. | |
| 6,452,609 B1 * | 9/2002 | Katinsky et al. | 345/716 |
| 6,452,974 B1 | 9/2002 | Menon et al. | |
| 6,496,802 B1 | 12/2002 | van Zoest et al. | |
| 6,587,127 B1 | 7/2003 | Leeke et al. | |
| 6,686,918 B1 * | 2/2004 | Cajolet et al. | 345/473 |
| 6,715,126 B1 | 3/2004 | Chang et al. | |

* cited by examiner

Primary Examiner—Cao (Kevin) Nguyen
(74) Attorney, Agent, or Firm—Lee & Hayes, PLLC

(57) ABSTRACT

Methods and systems are described that assist media players in rendering different media types. In some embodiments, a unified rendering area is provided and managed such that multiple different media types are rendered by the media player in the same user interface area. This unified rendering area thus permits different media types to be presented to a user in an integrated and organized manner. An underlying object model promotes the unified rendering area by providing a base rendering object that has properties that are shared among the different media types. Object sub-classes are provided and are each associated with a different media type, and have properties that extend the shared properties of the base rendering object. In addition, an inventive approach to visualizations is presented that provides better synchronization between a visualization and its associated audio stream.

2 Claims, 15 Drawing Sheets

METHODS, SYSTEMS AND MEDIA PLAYERS FOR RENDERING DIFFERENT MEDIA TYPES

TECHNICAL FIELD

This invention relates to methods, systems and media players for rendering different media types.

BACKGROUND

Today, individuals are able to use their computers to download and play various media content. For example, many companies offer so-called media players that reside on a computer and allow a user to download and experience a variety of media content. For example, users can download media files associated with music and listen to the music via their media player. Users can also download video data and animation data and view these using their media players.

One problem associated with prior art media players is they all tend to display different types of media in different ways. For example, some media players are configured to provide a "visualization" when they play audio files. A visualization is typically a piece of software that "reacts" to the audio that is being played by providing a generally changing, often artistic visual display for the user to enjoy. Visualizations are often presented, by the prior art media players, in a window that is different from the media player window or on a different portion of the user's display. This causes the user to shift their focus away from the media player and to the newly displayed window. In a similar manner, video data or video streams are often provided within yet another different window which is either an entirely new display window to which the user is "flipped", or is a window located on a different portion of the user's display. Accordingly, these different windows in different portions of the user's display all combine for a fairly disparate and unorganized user experience. It is always desirable to improve the user's experience.

In addition, there are problems associated with prior art visualizations. As an example, consider the following. One of the things that makes visualizations enjoyable and interesting for users is the extent to which they "mirror" or follow the audio being played on the media player. Past visualization technology has led to visualizations that do not mirror or follow the audio as closely as one would like. This leads to things such as a lag in what the user sees after they have heard a particular piece of audio. It would be desirable to improve upon this media player feature.

Accordingly, this invention arose out of concerns associated with providing improved media players and user experiences regarding the same.

SUMMARY

Methods and systems are described that assist media players in rendering different media types. In some embodiments, a unified rendering area is provided and managed such that multiple different media types are rendered by the media player in the same user interface area. This unified rendering area thus permits different media types to be presented to a user in an integrated and organized manner. An underlying object model promotes the unified rendering area by providing a base rendering object that has properties that are shared among the different media types. Object sub-classes are provided and are each associated with a different media type, and have properties that extend the shared properties of the base rendering object. In addition, an inventive approach to visualizations is presented that provides better synchronization between a visualization and its associated audio stream.

DETAILED DESCRIPTION

Overview

Methods and systems are described that assist media players in rendering different media types. In some embodiments, a unified rendering area is provided and managed such that multiple different media types are rendered by the media player in the same user interface area. This unified rendering area thus permits different media types to be presented to a user in an integrated and organized manner. An underlying object model promotes the unified rendering area by providing a base rendering object that has properties that are shared among the different media types. Object sub-classes are provided and are each associated with a different media type, and have properties that extend the shared properties of the base rendering object. In addition, an inventive approach to visualizations is presented that provides better synchronization between a visualization and its associated audio stream.

Exemplary System

Figure 1:
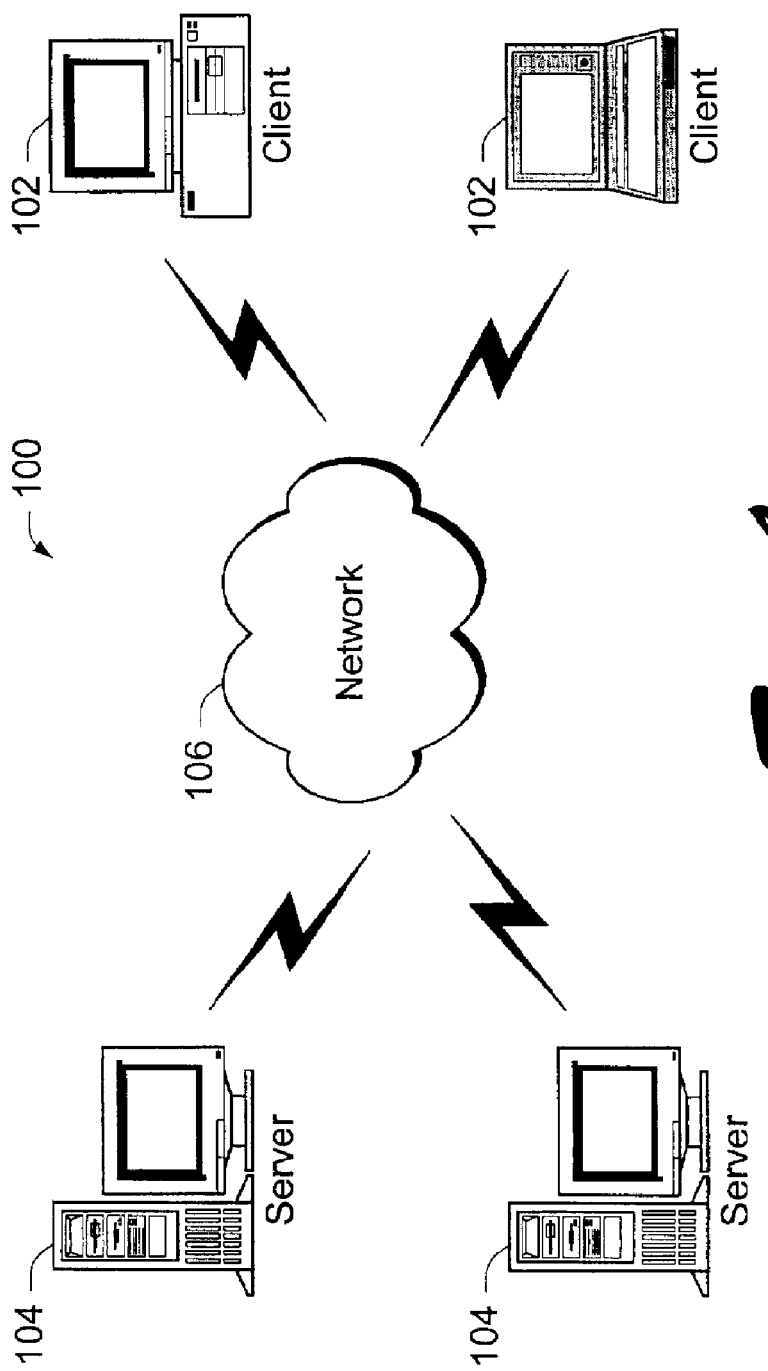
FIG. 1 is block diagram of a system in which various embodiments can be implemented.

FIG. 1 shows exemplary systems and a network, generally at 100, in which the described embodiments can be implemented. The systems can be implemented in connection with any suitable network. In the embodiment shown, the system can be implemented over the public Internet, using the World Wide Web (WWW or Web), and its hyperlinking capabilities. The description herein assumes a general knowledge of technologies relating to the Internet, and specifically of topics relating to file specification, file retrieval, streaming multimedia content, and hyperlinking technology.

System 100 includes one or more clients 102 and one or more network servers 104, all of which are connected for data communications over the Internet 106. Each client and server can be implemented as a personal computer or a similar computer of the type that is typically referred to as "IBM-compatible."

Figure 2:
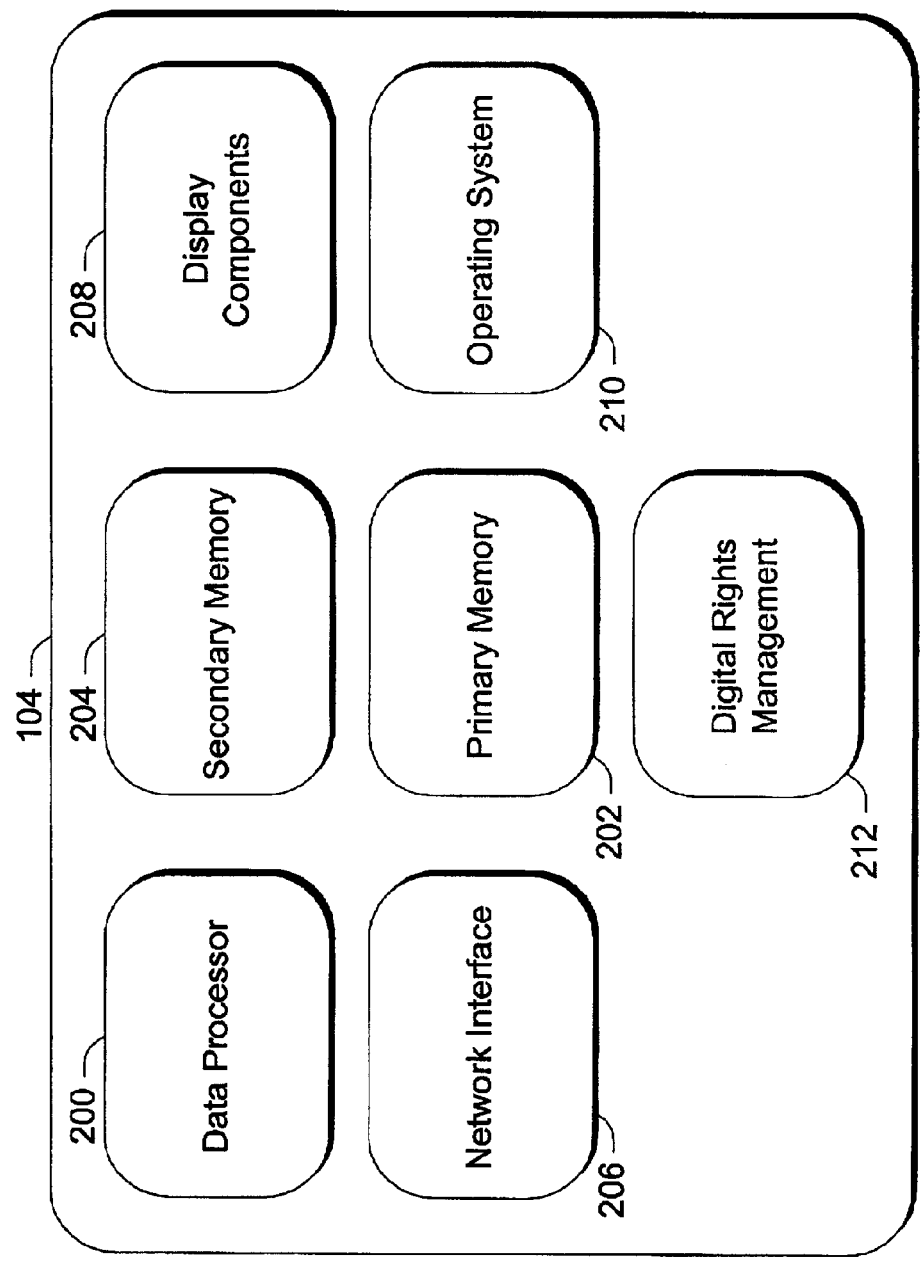
FIG. 2 is a block diagram of an exemplary server computer.

An example of a server computer 104 is illustrated in block form in FIG. 2 and includes conventional components such as a data processor 200; volatile and non-volatile primary electronic memory 202; secondary memory 204 such as hard disks and floppy disks or other removable media; network interface components 206; display devices interfaces and drivers 208; and other components that are well known. The computer runs an operating system 210 such as the Windows NT operating system. The server can also be configured with a digital rights management module 212 that is programmed to provide and enforce digital rights with respect to multimedia and other content that it sends to clients 102. Such digital rights can include, without limitation, functionalities including encryption, key exchange, license delivery and the like.

Network servers 104 and their operating systems can be configured in accordance with known technology, so that they are capable of streaming data connections with clients. The servers include storage components (such as secondary memory 204), on which various data files are stored and formatted appropriately for efficient transmission using known protocols. Compression techniques can be desirably used to make the most efficient use of limited Internet bandwidth.

Figure 3:
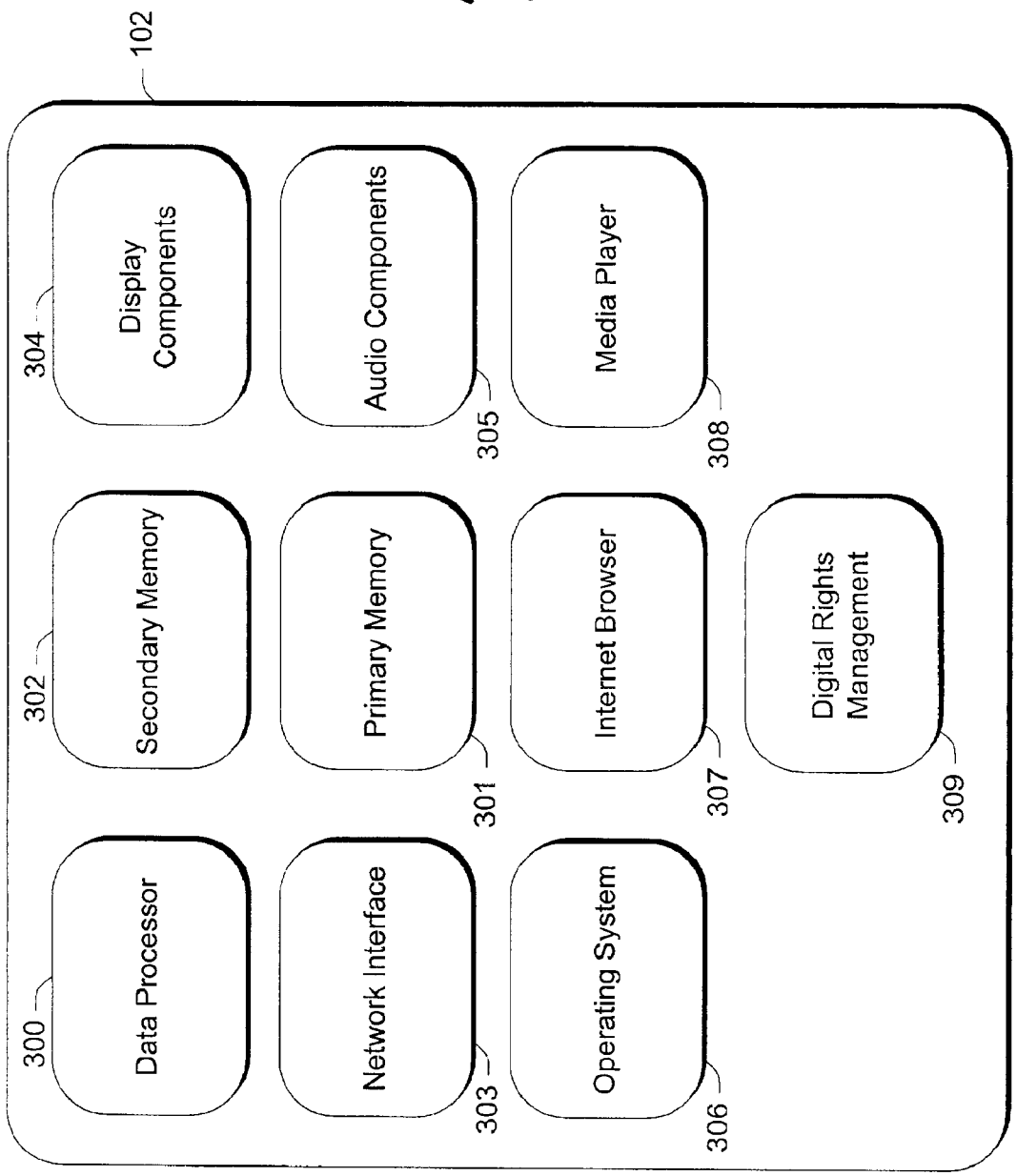
FIG. 3 is a block diagram of an exemplary client computer.

FIG. 3 shows an example of a client computer 102. Various types of clients can be utilized, such as personal computers, palmtop computers, notebook computers, personal organizers, etc. Client computer 104 includes conventional components similar to those of network server 104, including a data processor 300; volatile and non-volatile primary electronic memory 301; secondary memory 302 such as hard disks and floppy disks or other removable media; network interface components 303; display devices interfaces and drivers 304; audio recording and rendering components 305; and other components as are common in personal computers.

In the case of both network server 104 and client computer 102, the data processors are programmed by means of instructions stored at different times in the various computer-readable storage media of the computers. Programs are typically distributed, for example, on floppy disks or CD-ROMs. From there, they are installed or loaded into the secondary memory of a computer. At execution, they are loaded at least partially into the computer's primary electronic memory. The embodiments described herein can include these various types of computer-readable storage media when such media contain instructions or programs for implementing the described steps in conjunction with a microprocessor or other data processor. The embodiments can also include the computer itself when programmed according to the methods and techniques described below.

For purposes of illustration, programs and program components are shown in FIGS. 2 and 3 as discrete blocks within a computer, although it is recognized that such programs and components reside at various times in different storage components of the computer.

Client 102 is desirably configured with a consumer-oriented operating system 306, such as one of Microsoft Corporation's Windows operating systems. In addition, client 102 can run an Internet browser 307, such as Microsoft's Internet Explorer.

Client 102 can also include a multimedia data player or rendering component 308. An exemplary multimedia player is Microsoft's Media Player 7. This software component can be capable of establishing data connections with Internet servers or other servers, and of rendering the multimedia data as audio, video, visualizations, text, HTML and the like.

Player 308 can be implemented in any suitable hardware, software, firmware, or combination thereof. In the illustrated and described embodiment, it can be implemented as a standalone software component, as an ActiveX control (ActiveX controls are standard features of programs designed for Windows operating systems), or any other suitable software component.

In the illustrated and described embodiment, media player 308 is registered with the operating system so that it is invoked to open certain types of files in response to user requests. In the Windows operating system, such a user request can be made by clicking on an icon or a link that is associated with the file types. For example, when browsing to a Web site that contains links to certain music for purchasing, a user can simply click on a link. When this happens, the media player can be loaded and executed, and the file types can be provided to the media player for processing that is described below in more detail.

Exemplary Media Player UI

Figure 4:
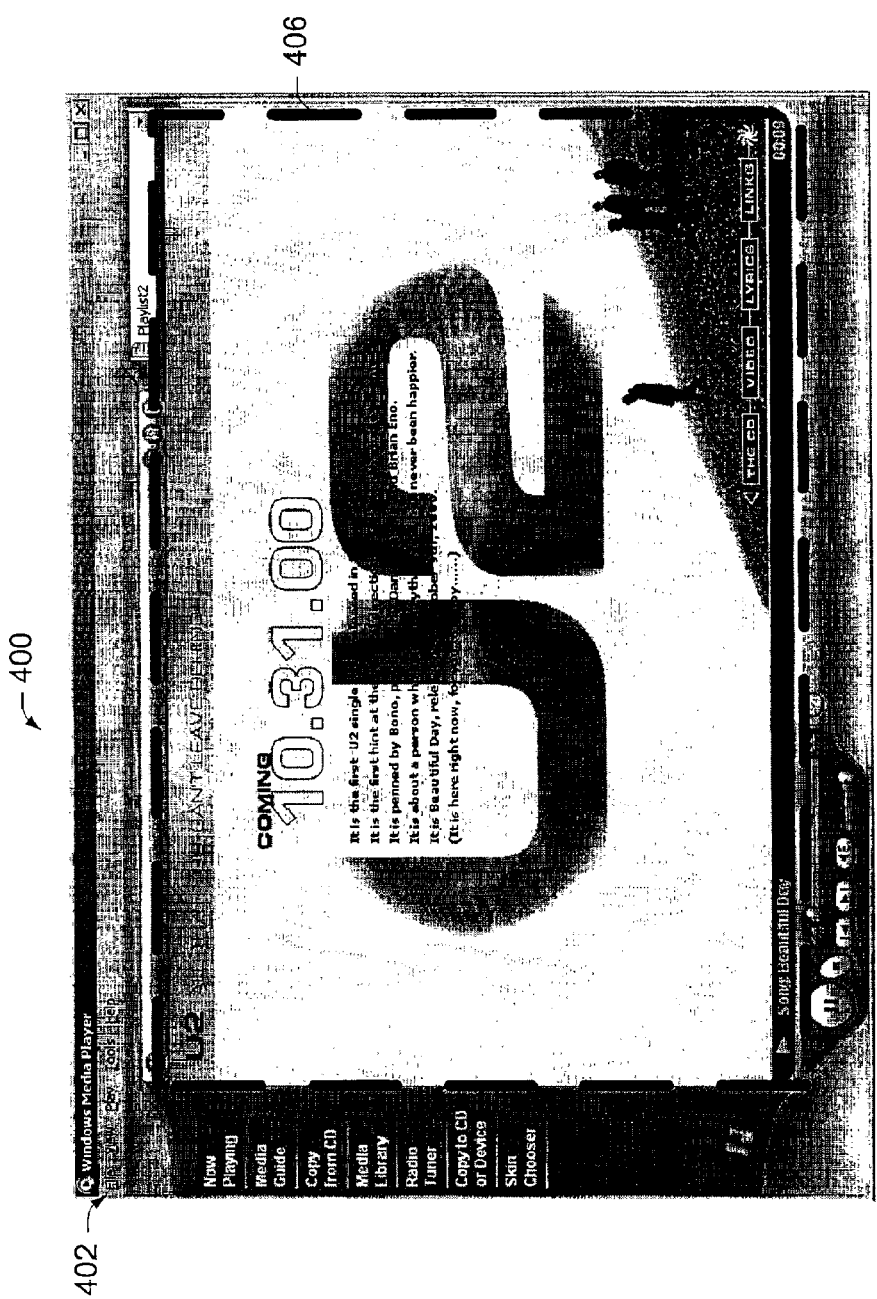
FIG. 4 is a diagram of an exemplary media player user interface (UI) that can be provided in accordance with one embodiment. The UI illustrates a unified rendering area in accordance with one embodiment.

FIG. 4 shows one exemplary media player user interface (UI) 400 that comprises part of a media player. The media player UI includes a menu 402 that can be used to manage the media player and various media content that can be played on and by the media player. Drop down menus are provided for file management, view management, play management, tools management and help management. In addition, a set of controls 404 are provided that enable a user to pause, stop, rewind, fast forward and adjust the volume of media that is currently playing on the media player.

A rendering area or pane 406 is provided in the UI and serves to enable multiple different types of media to be consumed and displayed for the user. The rendering area is highlighted with dashed lines. In the illustrated example, the U2 song "Beautiful Day" is playing and is accompanied by some visually pleasing art as well as information concerning the track. In one embodiment, all media types that are capable of being consumed by the media player are rendered in the same rendering area. These media types include, without limitation, audio, video, skins, borders, text, HTML and the like. Skins are discussed in more detail in U.S. patent applications Ser. Nos. 09/773,446 and 09/773,457, the disclosures of which are incorporated by reference.

Having a unified rendering area provides an organized and integrated user experience and overcomes problems associated with prior art media players discussed in the "Background" section above.

Figure 5:
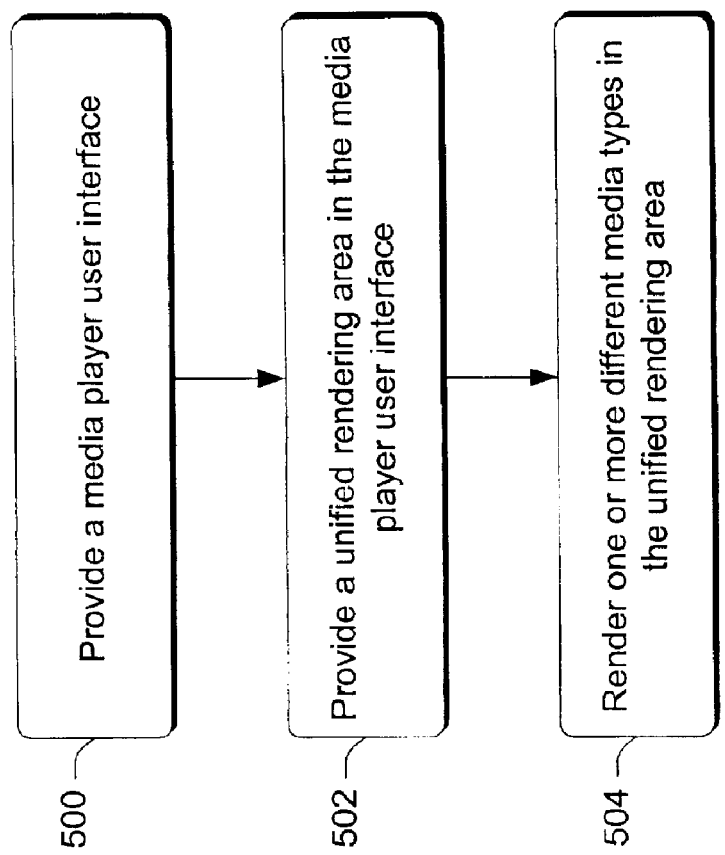
FIG. 5 is a flow diagram that describes steps in a method in accordance with one embodiment.

FIG. 5 is a flow diagram that describes steps in a method of providing a user interface in accordance with one embodiment. The method can be implemented in any suitable hardware, software, firmware or combination thereof. In the described embodiment, the method is implemented in software.

Step 500 provides a media player user interface. This step is implemented in software code that presents a user interface to the user when a media player application is loaded and executed. Step 502 provides a unified rendering area in the media player user interface. This unified rendering area is provided for rendering different media types for the user. It provides one common area in which the different media types can be rendered. In one embodiment, all visual media types that are capable of being rendered by the media player are rendered in this area. Step 504 then renders one or more different media types in the unified rendering area.

Although the method of FIG. 5 can be implemented in any suitable software using any suitable software programming techniques, the illustrated and described method is implemented using a common runtime model that unifies multiple (or all) media type rendering under one common rendering paradigm. In this model, there are different components that render the media associated with the different media types. The media player application, however, hosts all of the different components in the same area. From a user's perspective, then, all of the different types of media are rendered in the same area.

Exemplary Object Model

Figure 6:
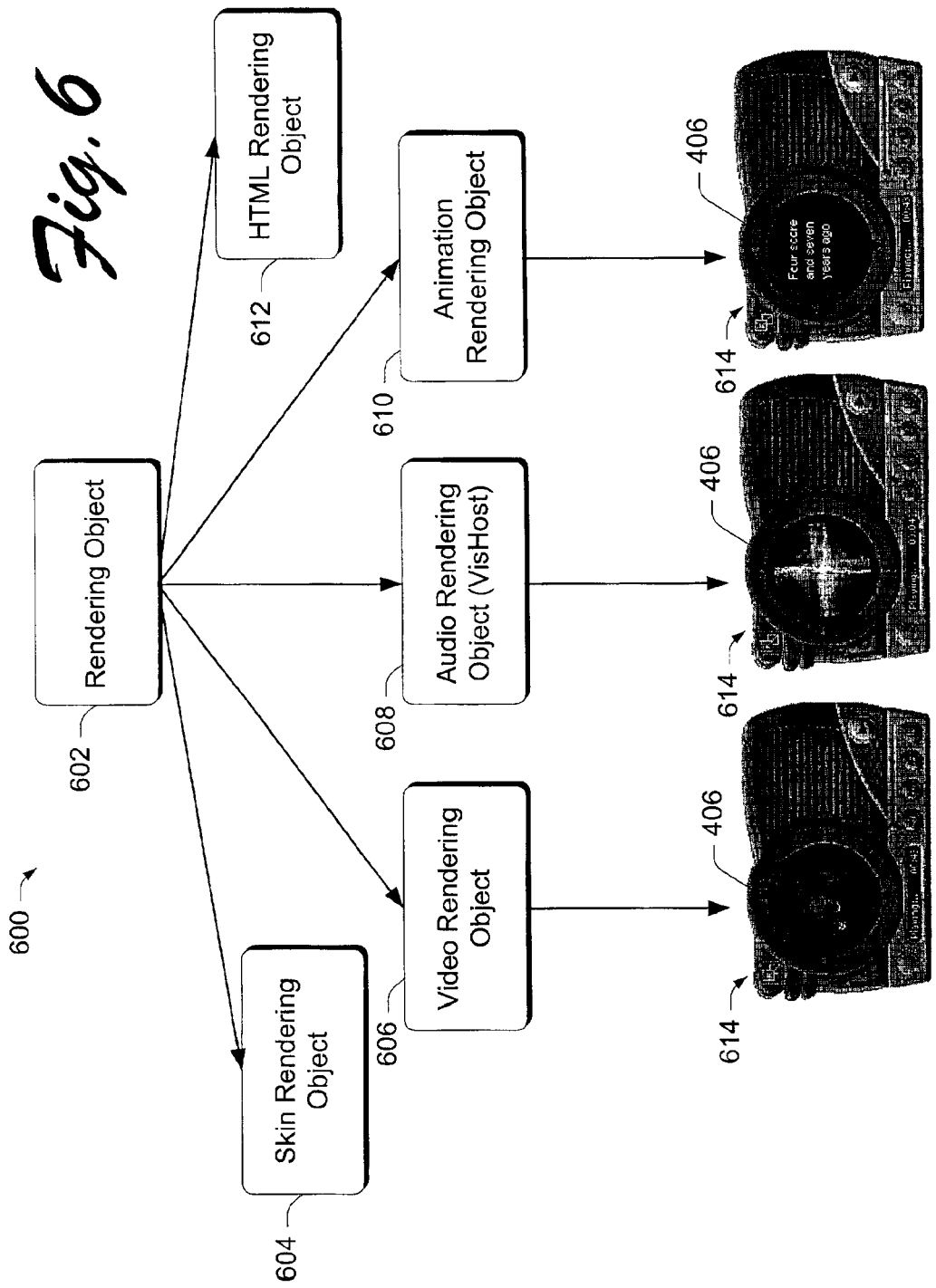
FIG. 6 is a block diagram that helps to illustrate an object model in accordance with one embodiment.

FIG. 6 shows components of an exemplary object model in accordance with one embodiment generally at 600. Object model 600 enables different media types to be rendered in the same rendering area on a media player UI. The object model has shared attributes that all objects support. Individual media type objects have their own special attributes that they support. Examples of these attributes are given below.

The object model includes a base object called a "rendering object" 602. Rendering object 602 manages and defines the unified rendering area 406 (FIG. 4) where all of the different media types are rendered. In addition to rendering object 602, there are multiple different media type rendering objects that are associated with the different media types that can get rendered the unified rendering area. In the illustrated and described embodiment, these other rendering objects include, without limitation, a skin rendering object 604, a video rendering object 606, an audio rendering object 608, an animation rendering object 610, and an HTML rendering object 612. It should be noted that some media type rendering objects can themselves host a rendering object. For example, skin rendering object 604 can host a rendering object within it such that other media types can be rendered within the skin. For example, a skin can host a video rendering object so that video can be rendered within a skin. It is to be appreciated and understood that other rendering objects associated with other media types can be provided.

Rendering objects 604–612 are subclasses of the base object 602. Essentially then, in this model, rendering object 602 defines the unified rendering area and each of the individual rendering objects 604–612 define what actually gets rendered in this area. For example, below each of objects 606, 608, and 610 is a media player skin 614 having a unified rendering area 406. As can be seen, video rendering object 606 causes video data to be rendered in this area; audio rendering object 608 causes a visualization to be rendered in this area; and animation rendering object 610 causes text to be rendered in this area. All of these different types of media are rendered in the same location.

In this model, the media player application can be unaware of the specific media type rendering objects (i.e. objects 604–612) and can know only about the base object 602. When the media player application receives a media type for rendering, it calls the rendering object 602 with the particular type of media. The rendering object ascertains the particular type of media and then calls the appropriate media type rendering object and instructs the object to render the media in the unified rendering area managed by rendering object 602. As an example, consider the following. The media player application receives video data that is to be rendered by the media player application. The application calls the rendering object 602 and informs it that it has received video data. Assume also that the rendering object 602 controls a rectangle that defines the unified rendering area of the UI. The rendering object ascertains the correct media type rendering object to call (here, video rendering object 606 ), call the object 606, and instructs object 606 to render the media in the rectangle (i.e. the unified rendering area) controlled by the rendering object 602. The video rendering object then renders the video data in the unified rendering area thus providing a UI experience that looks like the one shown by skin 614 directly under video rendering object 606.

Common Runtime Properties

In the above object model, multiple media types share common runtime properties. In the described embodiment, all media types share these properties:

| Attribute | Description |
| --- | --- |
| clippingColor | Specifies or retrieves the color to clip out from the clippingImage bitmap. |
| clippingImage | Specifies or retrieves the region to clip the control to. |
| elementType | Retrieves the type of the element (for instance, BUTTON). |
| enabled | Specifies or retrieves a value indicating whether the control is enabled or disabled. |
| height | Specifies or retrieves the height of the control. |
| horizontalAlignment | Specifies or retrieves the horizontal alignment of the control when the VIEW or parent SUBVIEW is resized. |
| id | Specifies or retrieves the identifier of a control. Can only be set at design time. |
| left | Specifies or retrieves the left coordinate of the control. |
| passThrough | Specifies or retrieves a value indicating whether the control will pass all mouse events through to the control under it. |
| tabStop | Specifies or retrieves a value indicating whether the control will be in the tabbing order. |
| top | Specifies or retrieves the top coordinate of the control. |
| verticalAlignment | Specifies or retrieves the vertical alignment of the control when the VIEW or parent SUBVIEW is resized. |
| visible | Specifies or retrieves the visibility of the control. |
| width | Specifies or retrieves the width of the control. |
| zIndex | Specifies or retrieves the order in which the control is rendered. |

Examples of video-specific settings that extend these properties for video media types include:

| Attribute | Description |
| --- | --- |
| backgroundColor | Specifies or retrieves the background color of the Video control. |
| cursor | Specifies or retrieves the cursor value that is used when the mouse is over a clickable area of the video. |

-continued

| Attribute | Description |
| --- | --- |
| fullScreen | Specifies or retrieves a value indicating whether the video is displayed in full-screen mode. Can only be set at run time. |
| maintainAspectRatio | Specifies or retrieves a value indicating whether the video will maintain the aspect ratio when trying to fit within the width and height defined for the control. |
| shrinkToFit | Specifies or retrieves a value indicating whether the video will shrink to the width and height defined for the Video control. |
| stretchToFit | Specifies or retrieves a value indicating whether the video will stretch itself to the width and height defined for the Video control. |
| toolTip | Specifies or retrieves the ToolTip text for the video window. |
| windowless | Specifies or retrieves a value indicating whether the Video control will be windowed or windowless; that is, whether the entire rectangle of the control will be visible at all times or can be clipped. Can only be set at design time. |
| zoom | Specifies the percentage by which to scale the video. |

Examples of audio-specific settings that extend these properties for audio media types include:

| Attribute | Description |
| --- | --- |
| allowAll | Specifies or retrieves a value indicating whether to include all the visualizations in the registry. |
| currentEffect | Specifies or retrieves the current visualization. |
| currentEffectPresetCount | Retrieves number of available presets for the current visualization. |
| currentEffectTitle | Retrieves the display title of the current visualization. |
| currentEffectType | Retrieves the registry name of the current visualization. |
| currentPreset | Specifies or retrieves the current preset of the current visualization. |
| currentPresetTitle | Retrieves the title of the current preset of the current visualization. |
| effectCanGoFullScreen | Retrieves a value indicating whether the current visualization can be displayed full-screen. |

Exemplary Method

Figure 7:
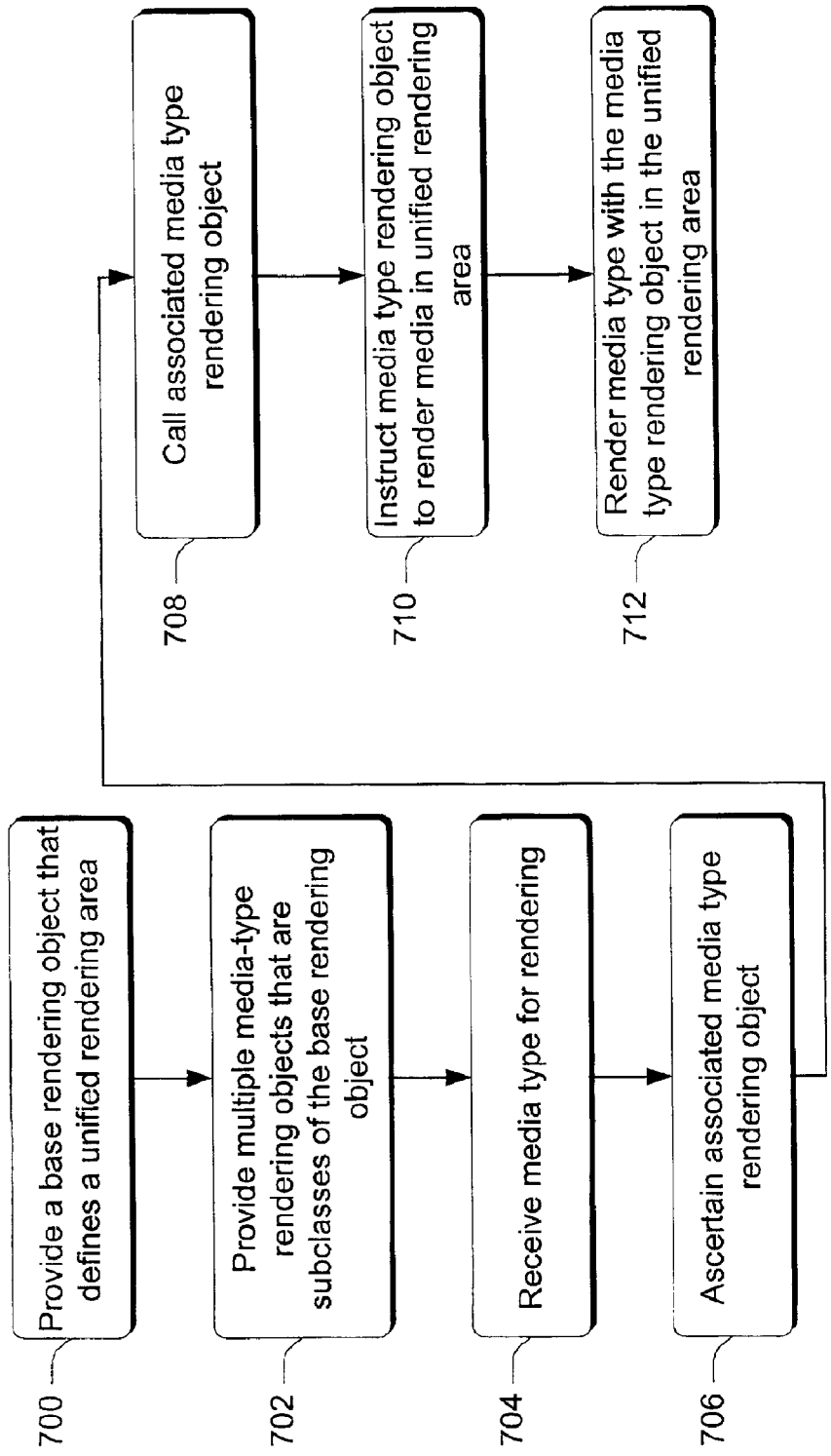
FIG. 7 is a flow diagram that describes steps in a method in accordance with one embodiment.

FIG. 7 is a flow diagram that describes steps in a media rendering method in accordance with one embodiment. The method can be implemented in any suitable hardware, software, firmware, or combination thereof. In the illustrated and described embodiment, the method is implemented in software. This software can comprise part of a media player application program executing on a client computer.

Step 700 provides a base rendering object that defines a unified rendering area. The unified rendering area desirably provides an area within which different media types can be rendered. These different media types can comprise any media types that are typically rendered or renderable by a media player. Specific non-limiting examples are given above. Step 702 provides multiple media-type rendering objects that are subclasses of the base rendering objects. These media-type rendering objects share common properties among them, and have their own properties that extend these common properties. In the illustrated example, each media type rendering object is associated with a different type of media. For example, there are media-type rendering objects associated with skins, video, audio (i.e. visualizations), animations, and HTML to name just a few. Each media-type rendering object is programmed to render its associated media type. Some media type rendering objects can also host other rendering objects so that the media associated with the hosted rendering object can be rendered inside a UI provided by the host.

Step 704 receives a media type for rendering. This step can be performed by a media player application. The media type can be received from a streaming source such as over a network, or can comprise a media file that is retrieved, for example, off of the client hard drive. Once the media type is received, step 706 ascertains an associated media type rendering object. In the illustrated example, this step can be implemented by having the media player application call the base rendering object with the media type, whereupon the base rendering object can ascertain the associated media type rendering object. Step 708 then calls the associated media-type rendering object and step 710 instructs the media-type rendering object to render media in the unified rendering area. In the illustrated and described embodiment, these steps are implemented by the base rendering object. Step 712 then renders the media type in the unified rendering area using the media type rendering object.

The above-describe object model and method permit multiple different media types to be associated with a common rendering area inside of which all associated media can be rendered. The user interface that is provided by the object model can overcome problems associated with prior art user interfaces by presenting a unified, organized and highly integrated user experience regardless of the type of media that is being rendered.

Visualizations

As noted above, particularly with respect to FIG. 6 and the associated description, one aspect of the media player provides so-called "visualizations." In the FIG. 6 example, visualizations are provided, at least in part, by the audio rendering object 608, also referred to herein as the "VisHost." The embodiments described below accurately synchronize a visual representation (i.e. visualization) with an audio waveform that is currently playing on a client computer's speaker.

Figure 8:
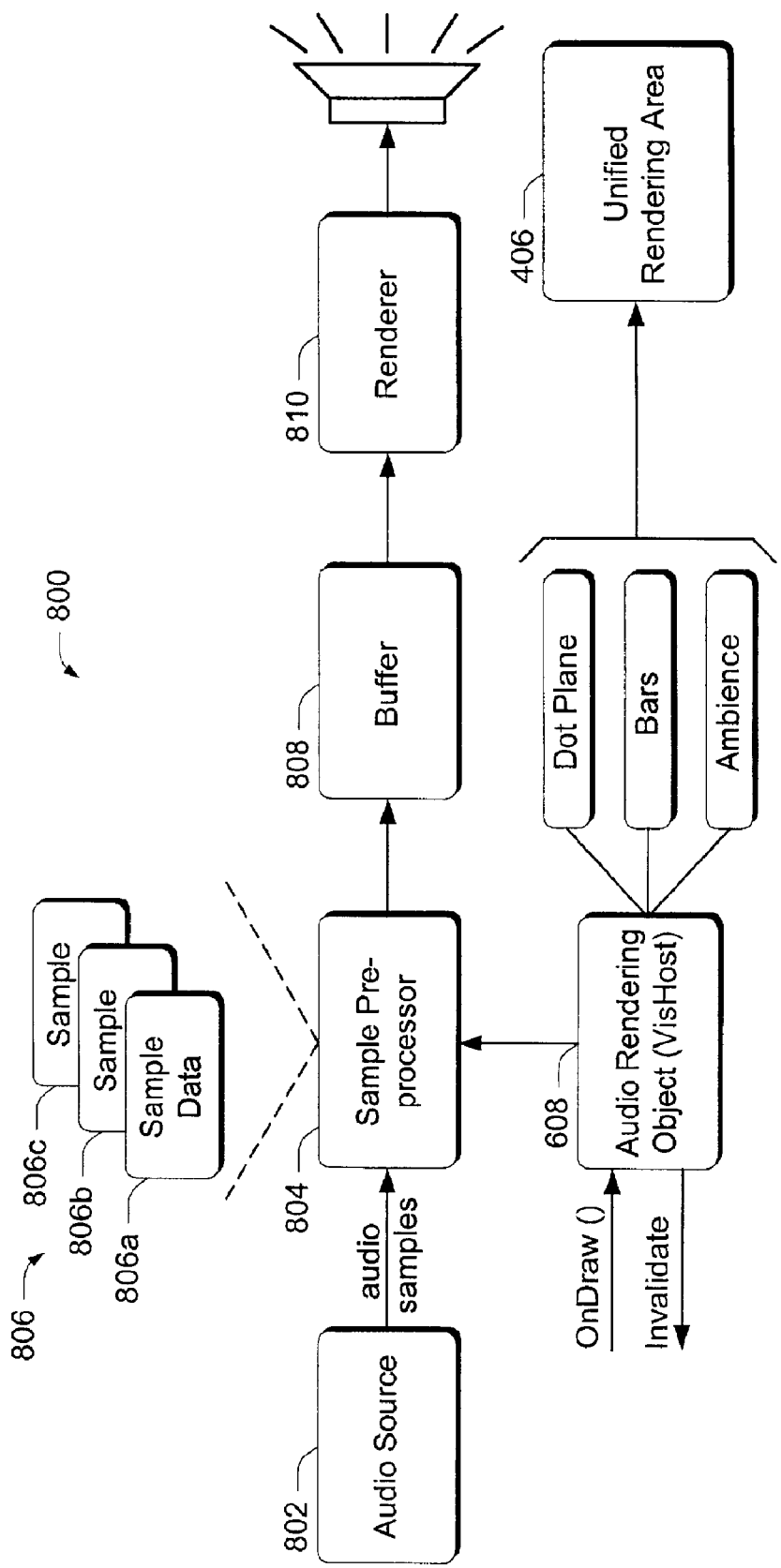
FIG. 8 is a block diagram that illustrates an exemplary system for synchronizing a visualization with audio samples in accordance with one embodiment.

FIG. 8 shows one embodiment of a system configured to accurately synchronize a visual representation with an audio waveform generally at 800. System 800 comprises one or more audio sources 802 that provide the audio waveform. The audio sources provide the audio waveform in the form of samples. Any suitable audio source can be employed such as a streaming source or an audio file. In addition, different types of audio samples can be provided from relatively simple 8-bit samples, to somewhat more complex 16-bit samples and the like.

An audio sample preprocessor 804 is provided and performs some different functions. An exemplary audio sample preprocessor is shown in more detail in FIG. 9.

Figure 9:
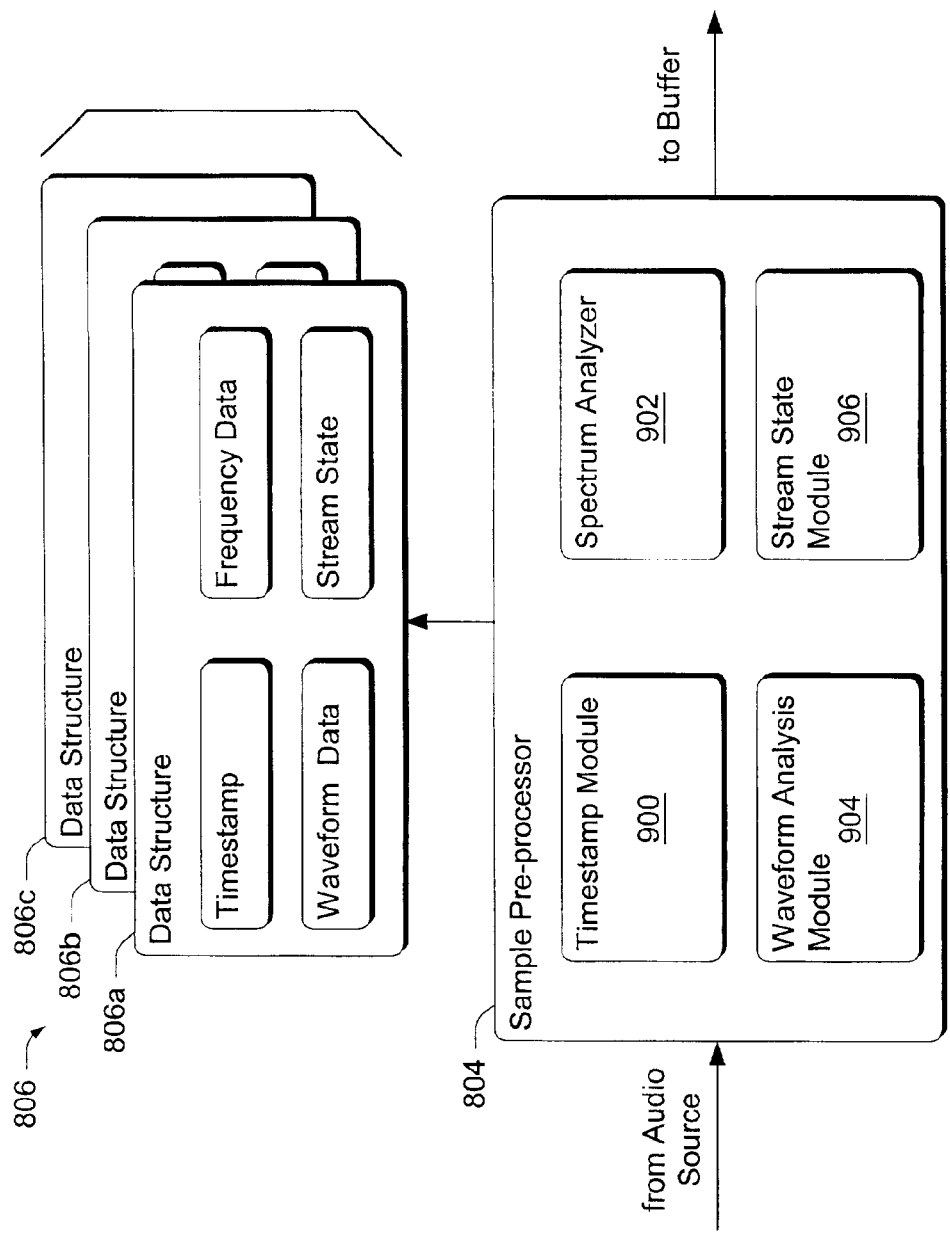
FIG. 9 is a block diagram that illustrates exemplary components of a sample pre-processor in accordance with one embodiment.

Referring both to FIGS. 8 and 9, as the audio samples stream into the preprocessor 804, it builds and maintains a collection of data structures indicated generally at 806. Each audio sample that is to be played by the media player has an associated data structure that contains data that characterizes the audio sample. These data structures are indicated at 806a, 806b, and 806c. The characterizing data is later used to render a visualization that is synchronized with the audio sample when the audio sample is rendered. The preprocessor comprises a timestamp module 900 (FIG. 9) that provides a timestamp for each audio sample. The timestamps for each audio sample are maintained in a sample's data structure (FIG. 9). The timestamp is assigned by the timestamp module to the audio sample based on when the audio sample is calculated to be rendered by the media player. As an aside, timestamps are assigned based on the current rendering time and a consideration of how many additional samples are in the pipeline scheduled for playing. Based on these parameters, a timestamp can be assigned by the timestamp module.

Preprocessor 804 also preprocesses each audio sample to provide characterizing data that is to be subsequently used to create a visualization that is associated with each audio sample. In one embodiment, the preprocessor 804 comprises a spectrum analyzer module 902 (FIG. 9) that uses a Fast Fourier Transform (FFT) to convert the audio samples from the time domain to the frequency domain. The FFT breaks the audio samples down into a set of 1024 frequency values or, as termed in this document, "frequency data." The frequency data for each audio sample is then maintained in the audio sample's data structure. In addition to maintaining the frequency data, the preprocessor 804 can include a waveform analysis module 904 that analyzes the audio sample to provide waveform data. The preprocessor 804 can also includes a stream state module 906 that provides data associated with the state of the audio stream (i.e. paused, stopped, playing, and the like).

Referring specifically to FIG. 8, a buffer 808 can be provided to buffer the audio samples in a manner that will be known and appreciated by those of skill in the art. A renderer 810 is provided and represents the component or components that are responsible for actually rendering the audio samples. The renderer can include software as well as hardware, i.e. an audio card.

FIG. 8 also shows audio rendering object or VisHost 608. Associated with the audio rendering object are various so-called effects. In the illustrated example, the effects include a dot plane effect, a bar effect, and a ambience effect. The effects are essentially software code that plugs into the audio rendering object 608. Typically, such effects can be provided by third parties that can program various creative visualizations. The effects are responsible for creating a visualization in the unified rendering area 406.

In the illustrated and described embodiment, the audio rendering object operates in the following way to ensure that any visualizations that are rendered in unified rendering area 406 are synchronized to the audio sample that is currently being rendered by renderer 810. The audio rendering object has an associated target frame rate that essentially defines how frequently the unified rendering area is drawn, redrawn or painted. As an example, a target frame rate might be 30 frames per second. Accordingly, 30 times per second, the audio rendering object issues what is known as an invalidation call to whatever object is hosting it. The invalidation call essentially notifies the host that it is to call the audio rendering object with a Draw or Paint command instructing the rendering object 608 to render whatever visualization is to be rendered in the unified rendering area 406. When the audio rendering object 608 receives the Draw or Paint command, it then takes steps to ascertain the preprocessed data that is associated with the currently playing audio sample. Once the audio rendering object has ascertained this preprocessed data, it can issue a call to the appropriate effect, say for example, the dot plane effect, and provide this preprocessed data to the dot plane effect in the form of a parameter that can then be used to render the visualization.

As a specific example of how this can take place, consider the following. When the audio rendering object receives its Draw or Paint call, it calls the audio sample preprocessor 804 to query the preprocessor for data, i.e. frequency data or waveform data associated with the currently playing audio sample. To ascertain what data it should send the audio rendering object 608, the audio sample preprocessor performs a couple of steps. First, it queries the renderer 810 to ascertain the time that is associated with the audio sample that is currently playing. Once the audio sample preprocessor ascertains this time, it searches through the various data structures associated with each of the audio samples to find the data structure with the timestamp nearest the time associated with the currently-playing audio sample. Having located the appropriate data structure, the audio sample preprocessor 804 provides the frequency data and any other data that might be needed to render a visualization to the audio rendering object 608. The audio rendering object then calls the appropriate effect with the frequency data and an area to which it should render (i.e. the unified rendering area 406) and instructs the effect to render in this area. The effect then takes the data that it is provided, incorporates the data into the effect that it is going to render, and renders the appropriate visualization in the given rendering area.

Exemplary Visualization Methods

Figure 10:
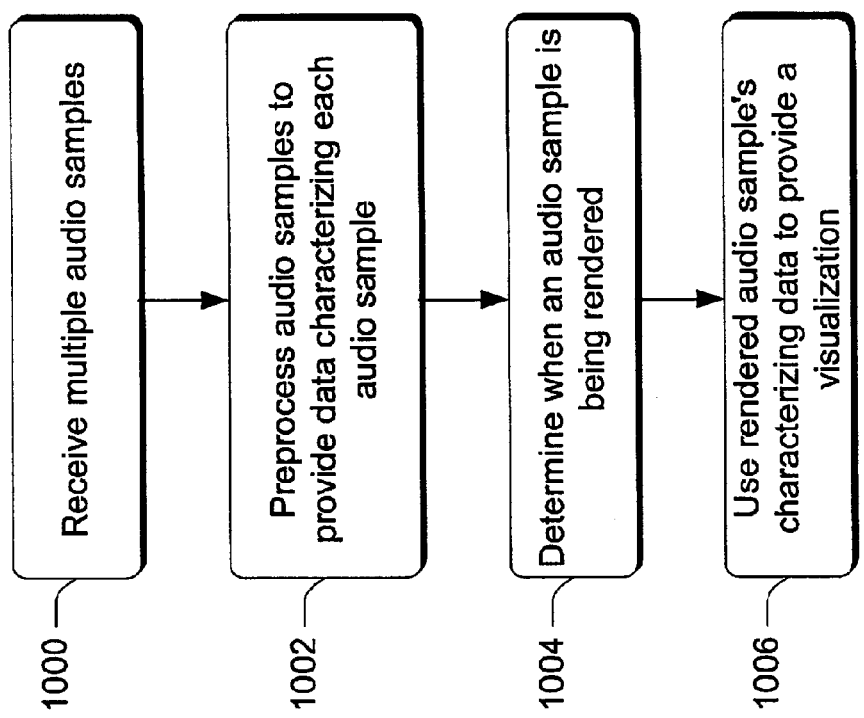
FIG. 10 is a flow diagram that describes steps in a method in accordance with one embodiment.

FIG. 10 is a flow diagram that describes steps in a method in accordance with one embodiment. The method can be implemented in any suitable hardware, software, firmware or combination thereof In the illustrated and described embodiment, the method is implemented in software. One exemplary software system that is capable of implementing the method about to be described is shown and described with respect to FIG. 8. It is to be appreciated and understood that FIG. 8 constitutes but one exemplary software system that can be utilized to implement the method about to be described.

Step 1000 receives multiple audio samples. These samples are typically received into an audio sample pipeline that is configured to provide the samples to a renderer that renders the audio samples so a user can listen to them. Step 1002 preprocesses the audio samples to provide characterizing data for each sample. Any suitable characterizing data can be provided. One desirable feature of the characterizing data is that it provides some measure from which a visualization can be rendered. In the above example, this measure was provided in the form of frequency data or wave data. The frequency data was specifically derived using a Fast Fourier Transform. It should be appreciated and understood that characterizing data other than that which is considered "frequency data", or that which is specifically derived using a Fast Fourier Transform, can be utilized. Step 1004 determines when an audio sample is being rendered. This step can be implemented in any suitable way. In the above example, the audio renderer is called to ascertain the time associated with the currently-playing sample. This step can be implemented in other ways as well. For example, the audio renderer can periodically or continuously make appropriate calls to notify interested objects of the time associated with the currently-playing sample. Step 1006 then uses the rendered audio sample's characterizing data to provide a visualization. This step is executed in a manner such that it is perceived by the user as occurring simultaneously with the audio rendering that is taking place. This step can be implemented in any suitable way. In the above example, each audio sample's timestamp is used as an index of sorts. The characterizing data for each audio sample is accessed by ascertaining a time associated with the currently-playing audio sample, and then using the current time as an index into a collection of data structures. Each data structure contains characterizing data for a particular audio sample. Upon finding a data structure with a matching (or comparatively close) timestamp, the characterizing data for the associated data structure can then be used provide a rendered visualization.

It is to be appreciated that other indexing schemes can be utilized to ensure that the appropriate characterizing data is used to render a visualization when its associated audio sample is being rendered.

Figure 11:
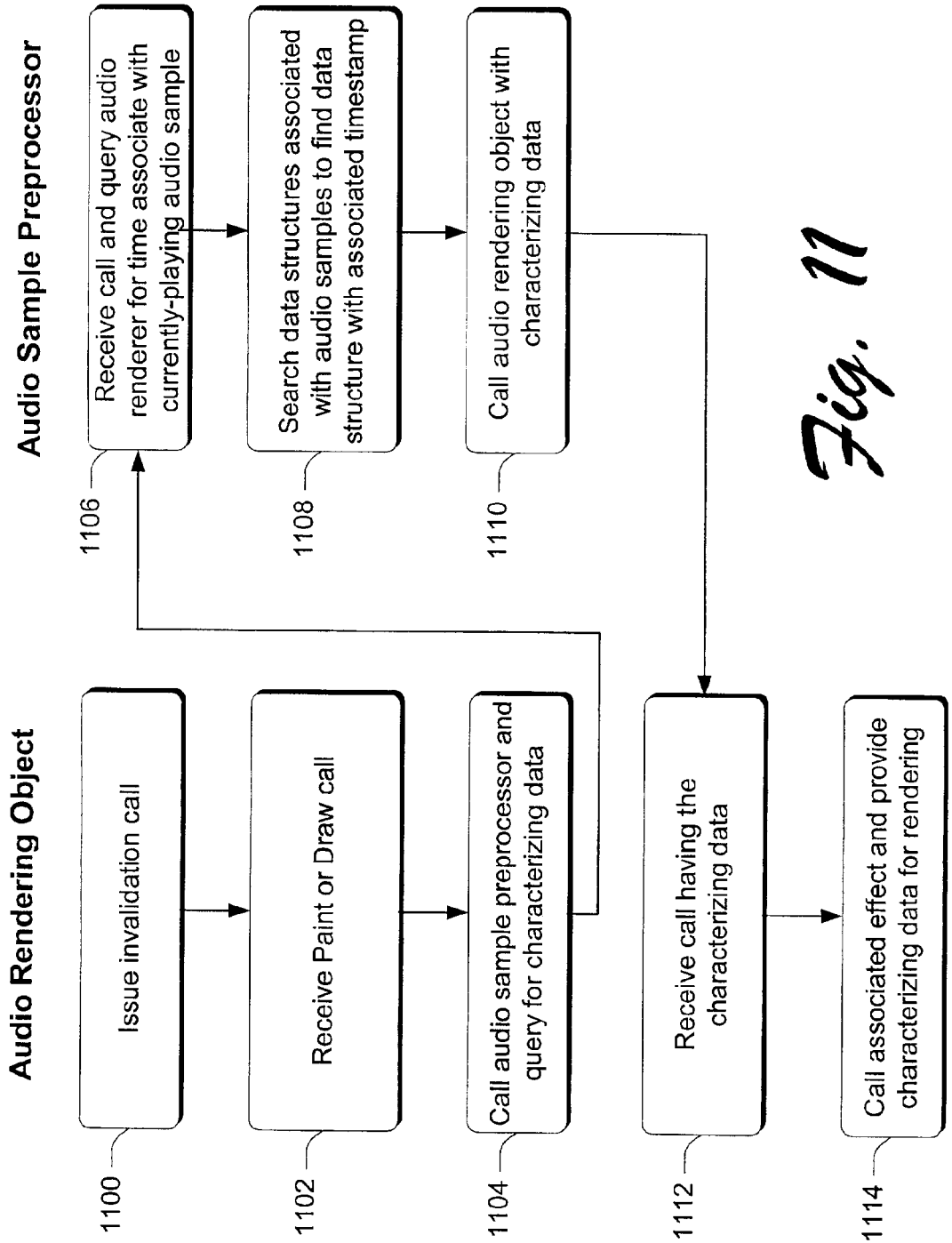
FIG. 11 is a flow diagram that describes steps in a method in accordance with one embodiment.

FIG. 11 is a flow diagram that describes steps in a method in accordance with one embodiment. The method can be implemented in any suitable hardware, software, firmware or combination thereof. In the illustrated and described embodiment, the method is implemented in software. In particular, the method about to be described is implemented by the system of FIG. 8. To assist the reader, the method has been broken into two portions to include steps that are implemented by audio rendering object 608 and steps that are implemented by audio sample preprocessor 804.

Step 1100 issues an invalidation call as described above. Responsive to issuing the invalidation call, step 1102 receives a Paint or Draw call from what ever object is hosting the audio rendering object. Step 1104 then calls, responsive to receiving the Paint or Draw call, the audio sample preprocessor and queries the preprocessor for data characterizing the audio sample that is currently being played. Step 1106 receives the call from the audio rendering object and responsive thereto, queries the audio renders for a time associated with the currently playing audio sample. The audio sample preprocessor then receives the current time and step 1108 searches various data structures associated with the audio samples to find a data structure with an associated timestamp. In the illustrated and described embodiment, this step looks for a data structure having timestamp nearest the time associated with the currently-playing audio sample. Once a data structure is found, step 1110 calls the audio rendering object with characterizing data associated with the corresponding audio sample's data structure. Recall that the data structure can also maintain this characterizing data. Step 1112 receives the call from the audio sample preprocessor. This call includes, as parameters, the characterizing data for the associated audio sample. Step 1114 then calls an associated effect and provides the characterizing data to the effect for rendering. Once the effect has the associated characterizing data, it can render the associated visualization.

This process is repeated multiple times per second at an associated frame rate. The result is that a visualization is rendered and synchronized with the audio samples that are currently being played.

Throttling

There are instances when visualizations can become computationally expensive to render. Specifically, generating individual frames of some visualizations at a defined frame rate can take more processor cycles than is desirable. This can have adverse effects on the media player application that is executing (as well as other applications) because less processor cycles are left over for it (them) to accomplish other tasks. Accordingly, in one embodiment, the media player application is configured to monitor the visualization process and adjust the rendering process if it appears that the rendering process is taking too much time.

Figure 12:
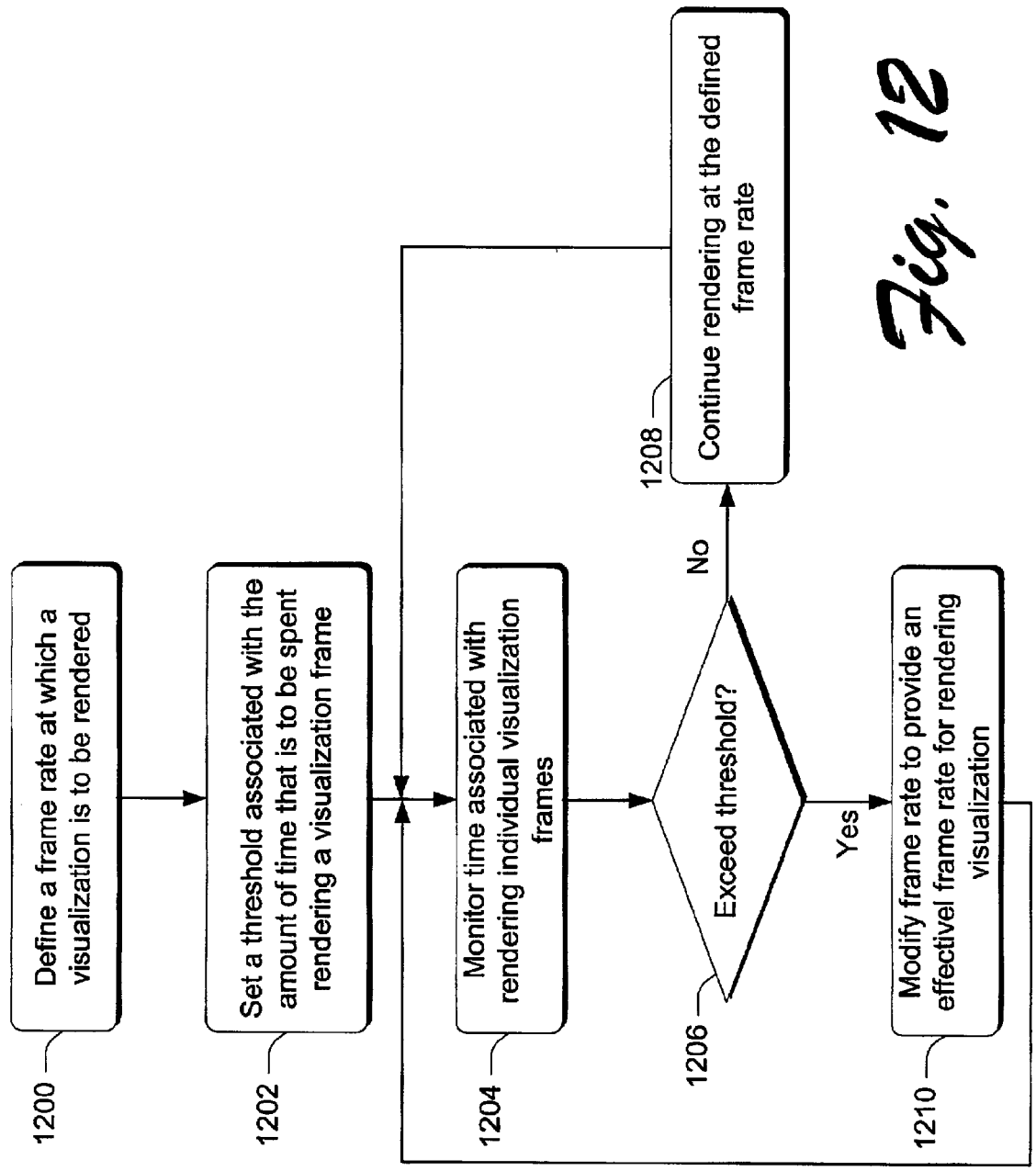
FIG. 12 is a flow diagram that describes steps in a method in accordance with one embodiment.

FIG. 12 is a flow diagram that describes a visualization monitoring process in accordance with one embodiment. The method can be implemented in any suitable hardware, software, firmware or combination thereof. In the illustrated example, the method is implemented in software. One embodiment of such software can be a media player application that is executing on a client computer.

Step 1200 defines a frame rate at which a visualization is to be rendered. This step can be accomplished as an inherent feature of the media player application. Alternately, the frame rate can be set in some other way. For example, a software designer who designs an effect for rendering a visualization can define the frame rate at which the visualization is to be rendered. Step 1202 sets a threshold associated with the amount of time that is to be spent rendering a visualization frame. This threshold can be set by the software. As an example, consider the following. Assume that step 1200 defines a target frame rate of 30 frames per second. Assume also that step 1202 sets a threshold such that for each visualization frame, only 60% of the time can be spent in the rendering process. For purposes of this discussion and in view of the FIG. 8 example, the rendering process can be considered as starting when, for example, an effect receives a call from the audio rendering object 608 to render its visualization, and ending when the effect returns to the audio rendering object that it has completed its task. Thus, for each second that a frame can be rendered, only 600 ms can actually be spent in the rendering process.

Figure 13:
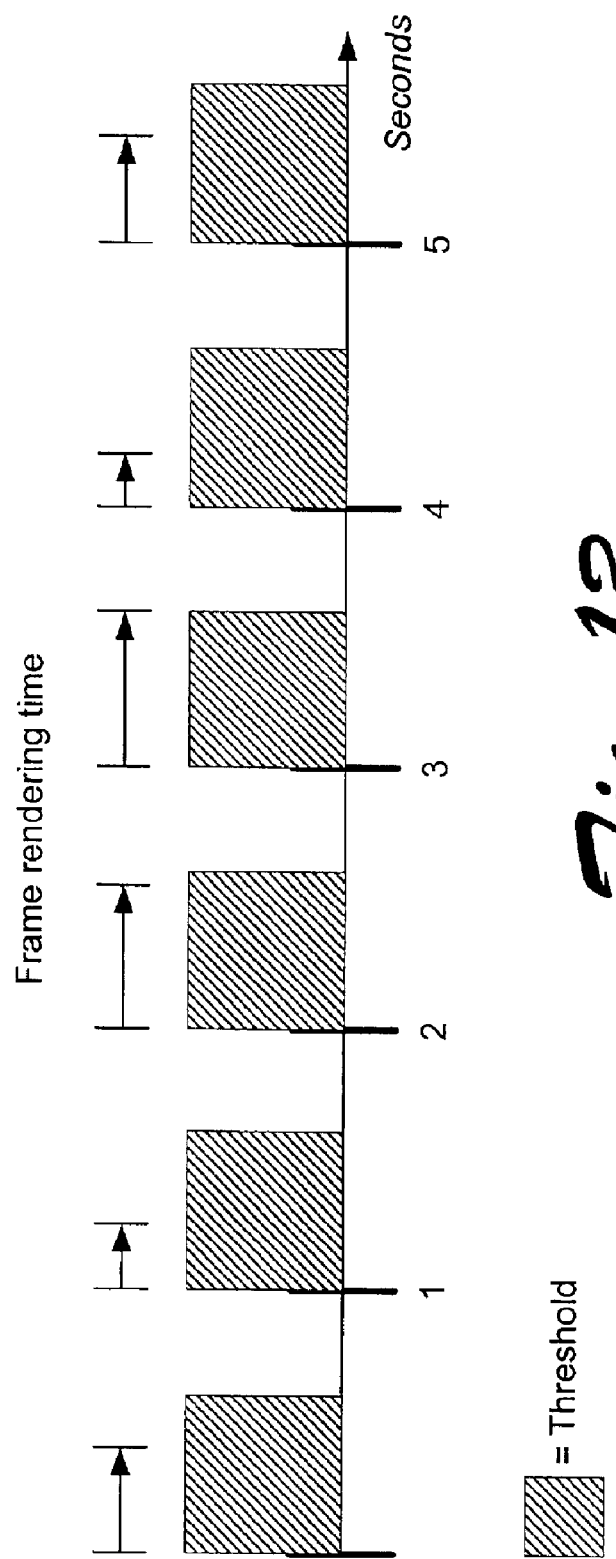
FIG. 13 is a timeline that is useful in understanding aspects of one embodiment.

FIG. 13 diagrammatically represents a timeline in one-second increments. For each second, a corresponding threshold has been set and is indicated by the cross-hatching. Thus, for each second, only 60% of the second can be spent in the visualization rendering process. In this example, the threshold corresponds to 600 ms of time.

Referring now to both FIGS. 12 and 13, step 1204 monitors the time associated with rendering individual visualization frames. This is diagrammatically represented by the "frame rendering times" that appear above the cross-hatched thresholds in FIG. 13. Notice that for the first frame, a little more than half of the allotted time has been used in the rendering process. For the second frame, a little less than half of the time has been used in the rendering process. For all of the illustrated frames, the rendering process has occurred within the defined threshold. The monitored rendering times can be maintained in an array for further analysis.

Step 1206 determines whether any of the visualization rendering times exceed the threshold that has been set. If none of the rendering times has exceeded the defined threshold, then step 1208 continues rendering the visualization frames at the defined frame rate. In the FIG. 13 example, since all of the frame rendering times do not exceed the defined threshold, step 1208 would continue to render the visualization at the defined rate.

Figure 14:
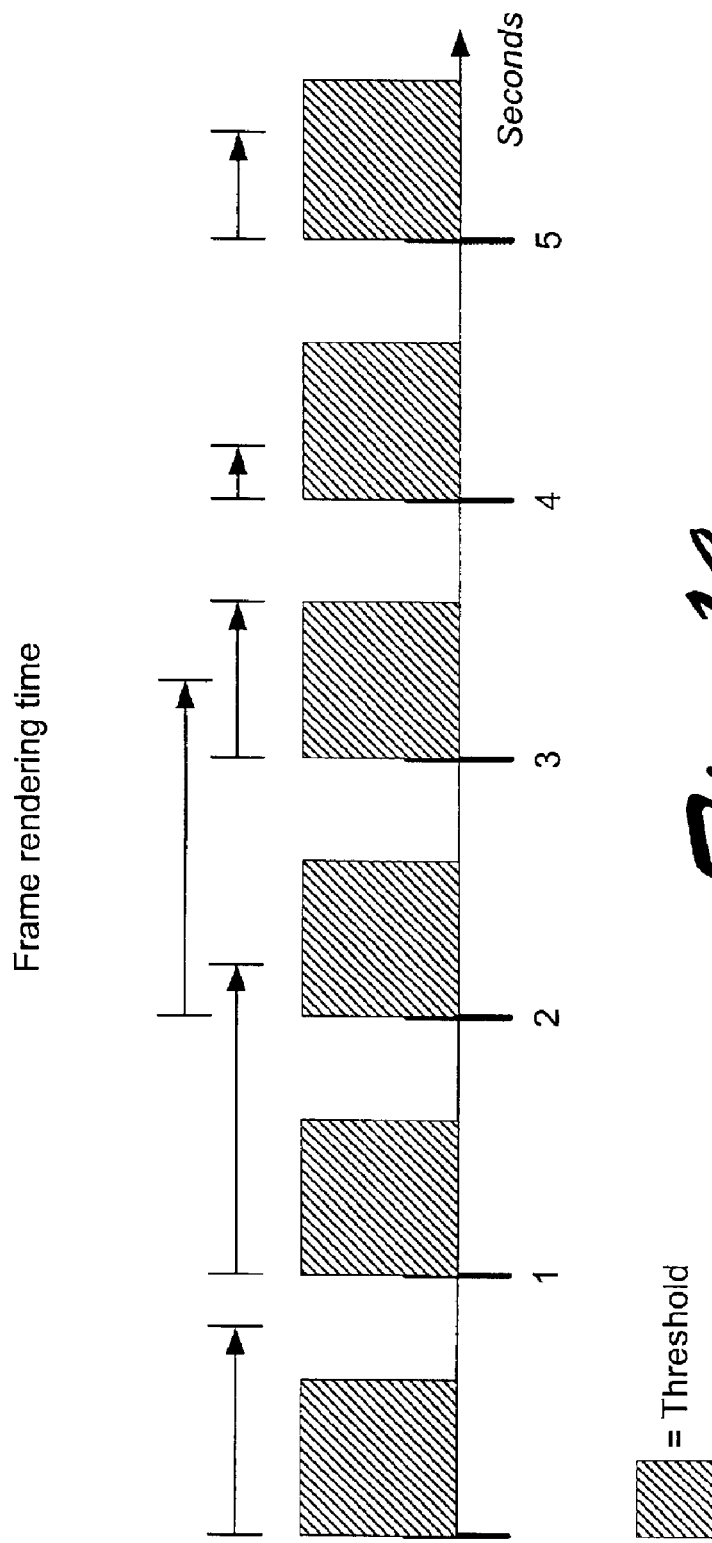
FIG. 14 is a timeline that is useful in understanding aspects of one embodiment.

Consider now FIG. 14. There, the rendering time associated with the first frame has run over the threshold but is still within the one-second time frame. The rendering time for the second frame, however, has taken not only the threshold time and the remainder of the one-second interval, but has extended into the one-second interval allotted for the next frame. Thus, when the effect receives a call to render the third frame of the visualization, it will still be in the process of rendering the second frame so that it is quite likely that the third frame of the visualization will not render properly. Notice also that had the effect been properly called to render the third frame (i.e. had there been no overlap with the second frame), its rendering time would have extended into the time allotted for the next-in-line frame to render. This situation can be problematic to say the least.

Referring again to FIG. 12, if step 1206 determines that the threshold has been exceeded, then step 1210 modifies the frame rate to provide an effective frame rate for rendering the visualization. In the illustrated and described embodiment, this step is accomplished by adjusting the interval at which the effect is called to render the visualization.

Figure 15:
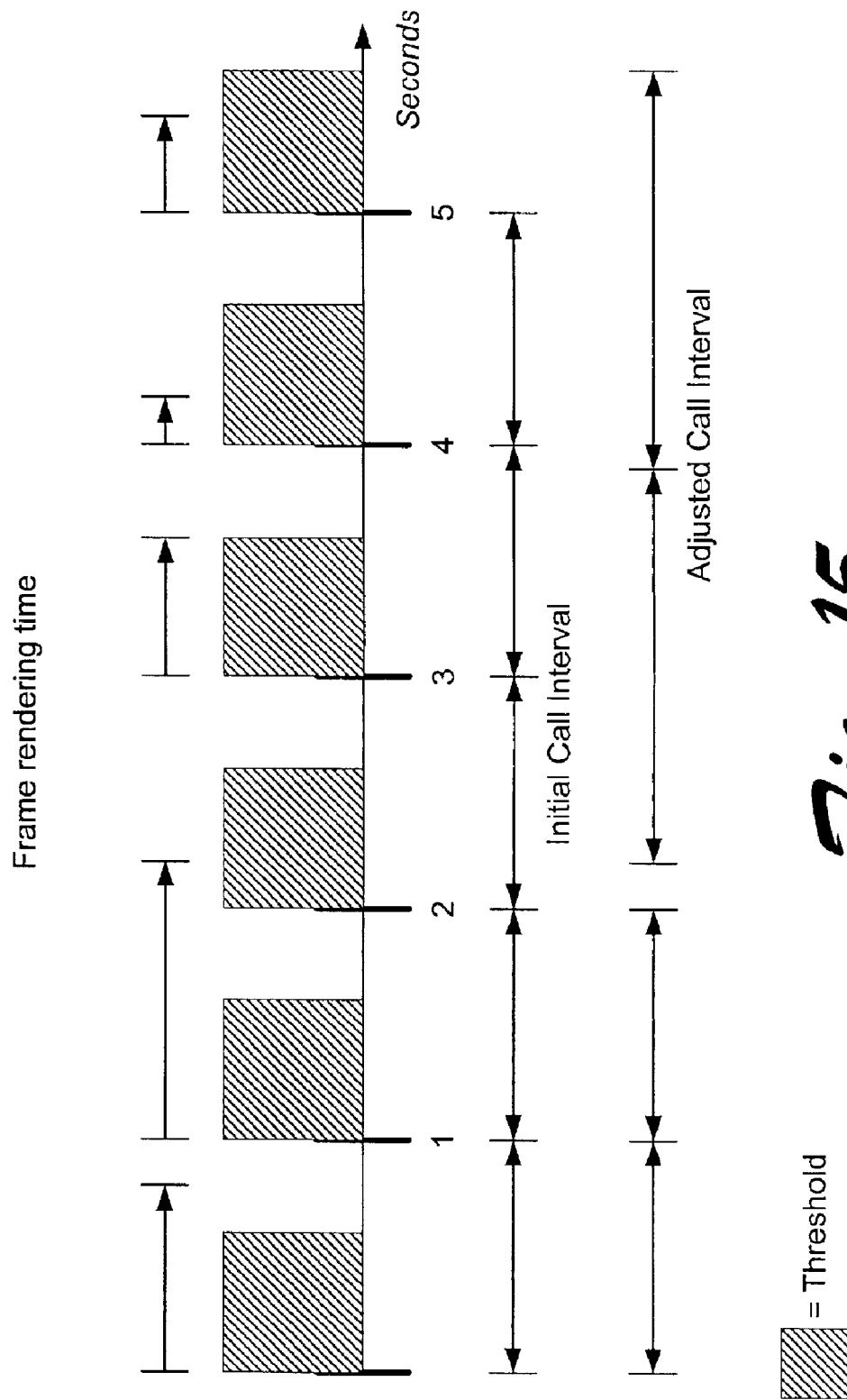
FIG. 15 is a timeline that is useful in understanding aspects of one embodiment.

Consider, for example, FIG. 15. There, an initial call interval is represented below the illustrated time line. When the second frame is rendered, the rendering process takes too long. Thus, as noted above, step 1210 modifies the frame rate by adjusting the time (i.e. lengthening the time) between calls to the effect. Accordingly, an "adjusted call interval" is indicated directly beneath the initial call interval. Notice that the adjusted call interval is longer than the initial call interval. This helps to ensure that the effects get called when they are ready to render a visualization and not when they are in the middle of rendering a visualization frame.

Notice also that step 1210 can branch back to step 1204 and continue monitoring the rendering times associated with the individual visualization frames. If the rendering times associated with the individual frames begin to fall back within the set threshold, then the method can readjust the call interval to the originally defined call interval.

Conclusion

The above-described methods and systems overcome problems associated with past media players in a couple of different ways. First, the user experience is enhanced through the use of a unified rendering area in which multiple different media types can be rendered. Desirably all media types that are capable of being rendered by a media player can be rendered in this rendering area. This presents the various media in a unified, integrated and organized way. Second, visualizations can be provided that more closely follow the audio content with which they should be desirably synchronized. This not only enhances the user experience, but adds value for third party visualization developers who can now develop more accurate visualizations.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A media player comprising software code that is configured to:

provide a base rendering object associated with a rendering area in which multiple different media types can be rendered, the rendering area providing at least a portion of a media player user interface that can be viewed by a user;

provide multiple different media type rendering objects each of which being associated with a different media type that can be rendered in the rendering area, the different media type rendering objects being configured to render their associated media and sharing common properties;

receive media associated with a media type for rendering in the rendering area;

call the base rendering object with the media type associated with the received media;

ascertain, with the base rendering object, an associated media type rendering object that is configured to render that media type;

call the associated media type rendering object with the base rendering object;

instruct the associated media type rendering object to render the received media in the rendering area; and render the associated media in the rendering area with the media type rendering object.

2. The media player of claim 1, wherein the different media types can comprises one or more of: audio types, video types, animation types, skin types, and HTML types.

* * * * *